(No Model.) 2 Sheets—Sheet 1.

W. BALSER.
ICE VELOCIPEDE.

No. 538,493. Patented Apr. 30, 1895.

WITNESSES
W S Landis
John C Bothwell

INVENTOR
William Balser
By McCleary & Hardcastle
Attorneys (No Model.)  W. BALSER.  2 Sheets—Sheet 2.
ICE VELOCIPEDE.

No. 538,493.  Patented Apr. 30, 1895.

UNITED STATES PATENT OFFICE.

WILLIAM BALSER, OF CANTON, OHIO.

ICE-VELOCIPEDE.

SPECIFICATION forming part of Letters Patent No. 538,493, dated April 30, 1895.

Application filed November 8, 1894. Serial No. 528,257. (No model.)

*To all whom it may concern:*

Be it known that I, WILLIAM BALSER, a citizen of the United States, residing at Canton, in the county of Stark and State of Ohio, have invented certain new and useful Improvements in Velocipedes; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to velocipedes, especially adapted for use on snow and ice, and the primary object of the invention is to provide mechanism by means of which a sled or sleigh may be propelled by its rider.

The invention consists in the combination with sleigh runners, and a suitable frame, of a propelling traction wheel, treadles geared thereto, and supporting, steering, and brake mechanism, as will be fully described hereinafter, and clearly defined in the appended claims.

Figure 1:
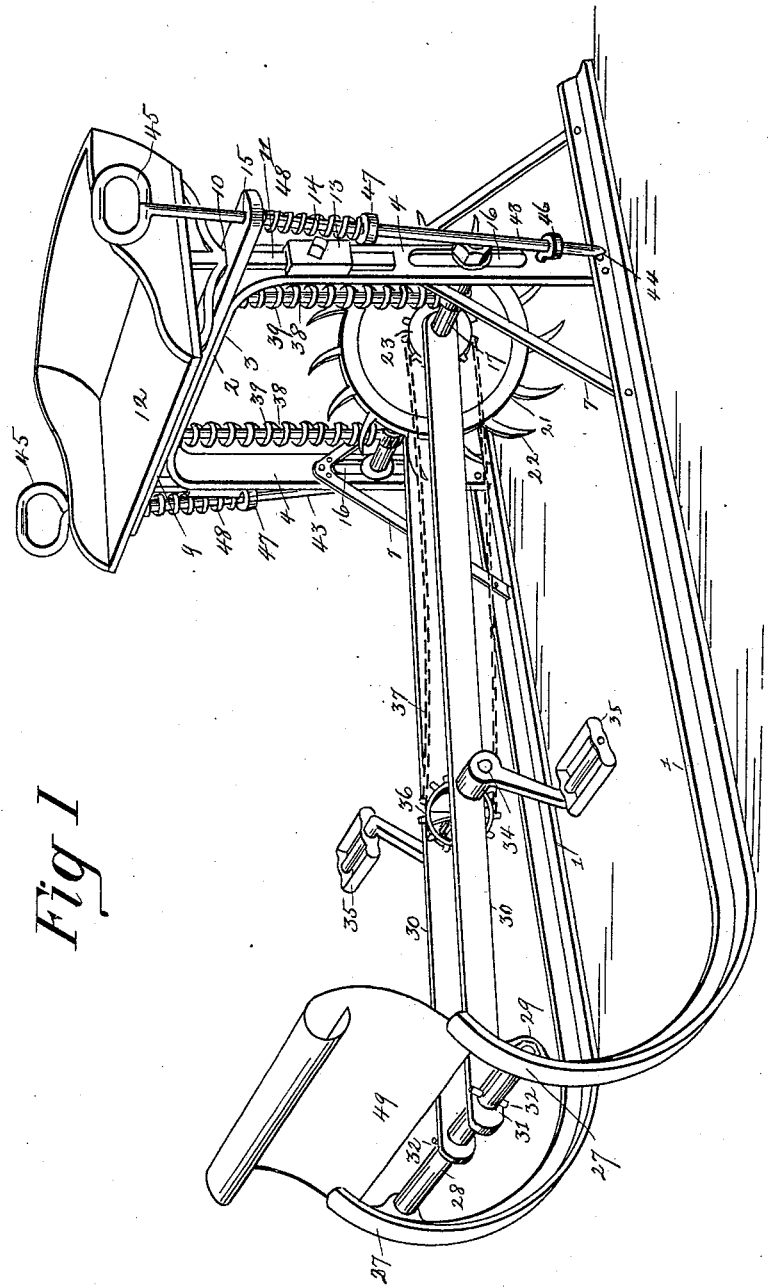
Figure 2:
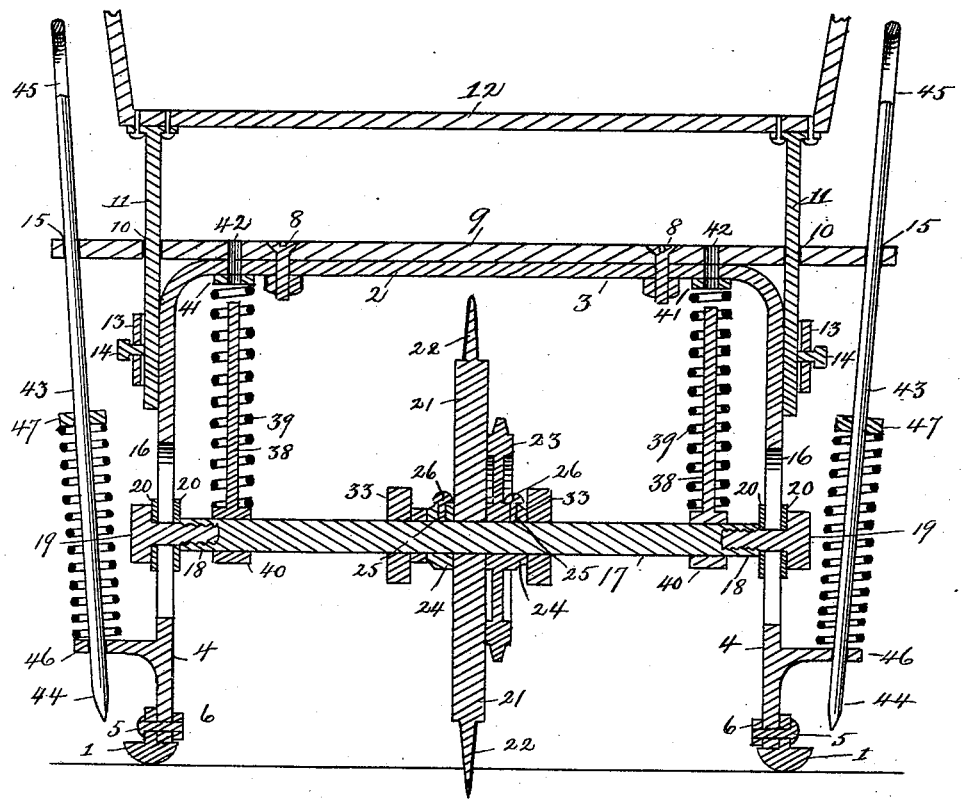

In the accompanying drawings, which form a part of this specification, Figure 1 is a perspective view of a sleigh provided with my improvements. Fig. 2 is a vertical section of a slightly-modified form of sleigh, taken through the seat-supporting devices and traction-wheel.

The reference numeral 1 indicates the sleigh runners secured near their rear ends to a frame 2. This frame consists of a cross bar 3, and depending side bars 4, and to the ends of the latter the runners are secured by bolts 5, and nuts 6, as clearly shown in Fig. 2. The frame and runners are securely braced together at each side by suitable angle braces 7, as illustrated in Fig. 1. Upon the top of the frame 2 is secured by bolts 8, a cross bar 9, formed with openings 10, through which extend the depending arms or brackets 11 of a seat 12. These bracket arms 11 pass through housings 13 formed on the outer sides of the frame, and are adjustably secured therein by set screws 14, thus permitting the seat to be raised or lowered at will. The outer ends of the cross bar 9 are formed with guide openings 15 for a purpose hereinafter explained.

The depending side bars 4, of the frame 2, are each formed with an elongated slot 16, through which project the ends of an axle or rotary shaft 17. While this shaft or axle and its securing nuts may be of any suitable construction, I have, in Fig. 2, shown the ends 18 of the axle, bored and internally threaded to receive threaded bolts 19, suitable washers 20 being arranged thereon. Centrally upon the axle 17 is rigidly mounted a traction wheel 21, provided with radial peripheral teeth or prongs 22, adapted to take into the snow or ice when the wheel is revolved. Upon one side of the traction wheel 21 and concentric therewith is rigidly mounted on the axle 17 a sprocket wheel 23. I preferably provide each of the wheels 21 and 23 with an integral hub 24, formed with an opening 25, to receive a set screw 26. The wheels are thus firmly secured upon the axle, but may be readily removed when required.

Between the upturned front ends 27 of the runners 1, is arranged a cross bar 28, supported in keepers 29, secured to the runners. To this cross bar 28 are pivotally secured the forward ends of two parallel longitudinal bars 30, said bars being formed with circular openings 31, through which the bar 28 passes, and with suitable pins 32 passing through openings in the bar 28; or, if preferred, the front ends of the bars 30 may be rigidly secured to the cross bar 28, and the latter be loosely supported in its bearings 29, so as to turn therein. The rear ends 33 of the longitudinal bars 30 are secured upon the axle 17 by forming said rear ends of the bars with circular openings through which the axle passes.

At a suitable distance in front of the seat 12 a crank shaft 34 is mounted in suitable bearings, between the parallel bars 30, said crank shaft being provided with pedals 35 as shown, and having mounted rigidly thereon between the bars 30, a sprocket wheel 36, connected by an endless chain 37 with the sprocket wheel 23 on the axle, to communicate motion to the latter. Projecting upwardly from the axle 17, and secured thereto in any preferred manner, are two plunger rods 38, one adjacent to each end of the axle within the frame 2. Surrounding each of these plunger rods 38, is a coil spring 39. The lower ends of these springs bear against the securing sleeves 40 of the rods 38, while their upper ends are adapted to strike or bear against, stationary rings or washers 41, secured to the under side of the cross bar 3 of the frame. The frame cross-bar 3, and the cross-bar 9 are formed with registering openings 42, through which the upper ends of the plunger rods 38 project at times during the travel of the sleigh.

At each side of the seat 12 is arranged a steering and brake device, consisting of a hand-rod or skid 43 pointed at their lower ends 44, and formed with loops or handles 45 at their upper ends. These steering rods extend through, and are supported by, the openings 15 in the ends of the cross bar 9, and keepers 46 projecting laterally from the side bars 4 of the frame 2. Each of said steering rods is provided with a fixed collar 47 at about its center, against which bears the lower end of a spring 48, coiled around the rod, the upper ends of said springs bearing against the under side of the cross bar 9, as shown in Fig. 1. If desired, these springs 48 may be located between the collars 47, and the keepers 46, as shown in Fig. 2.

The sleigh is preferably provided with a dask board 49.

The operation of the mechanism thus described will be readily understood.

When the crank shaft is revolved by means of the treadles 35, motion is communicated through the sprocket wheels 36 and 23, and chain 37, to the axle 17, thus revolving the traction wheel 21, the teeth or curved prongs of which, engage the snowy or icy surface, and propel the sleigh. The elongated slots 16 in the frame 1 are of sufficient width to permit a vertical play of the axle, while the plunger rods 38 and their springs, afford ample movement for the axle and its wheels in passing rough or uneven surfaces. The springs 39, tend to keep the teeth of the traction wheel 21 normally in contact with the ground surface, and the limited play afforded the plunger rods 38 by the openings 42, compensates for jars caused by obstructions on the surface being traveled.

The sleigh is readily guided by means of the steering rods 43, said rods being normally held out of contact with the surface by the springs 48, which latter yield when pressure is applied to the handles 45 to lower the rods, and retract the rods when the pressure is withdrawn.

Having fully described my invention, what I claim as new, and desire to secure by Letters Patent, is—

1. The combination with the runners, axle-supporting frame, axle, and traction wheel, of propelling gearing, a seat frame secured to the runners, and vertically slotted to receive the ends of the axle, a cross-bar resting on said seat frame, and provided with openings 10 through which the seat bracket-arms extend, housings on the seat frame, clamping screws for securing the seat brackets, and steering rods extending through openings in the ends of said cross-bar, and provided with retracting springs, substantially as described.

2. The combination with the runners and propelling mechanism, of a seat-frame secured to the runners, a cross-bar supported on said frame, said frame and cross-bar being formed with registering openings 42, plunger rods rising from the axle, and adapted to enter said openings, and coil springs surrounding said plunger-rods, substantially as described.

3. The combination with the runners and propelling mechanism, of a seat-frame, provided with laterally projecting loops or keepers, a cross-bar resting on said seat frame, and provided with end-openings 15, steering rods extending through said openings and said loops or keepers, and coil springs surrounding said steering rods and serving to hold the latter normally out of contact with the ground, substantially as described.

In testimony whereof I affix my signature in presence of two witnesses.

WILLIAM BALSER.

Witnesses:
F. O. McCLEARY,
WM. M. HARDCASTLE.